(12) United States Patent
McFadden et al.

(10) Patent No.: US 6,376,817 B1
(45) Date of Patent: *Apr. 23, 2002

(54) COMPACT QUICK-COOKING OVEN

(75) Inventors: David H. McFadden, Lexington, MA (US); James K. Pool, III, Richardson, TX (US); Earl R. Winkelman, Garland, TX (US); John David Gidner, Dallas, TX (US)

(73) Assignee: TurboChef Technologies, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/696,750

(22) Filed: Oct. 24, 2000

Related U.S. Application Data

(63) Continuation-in-part of application No. 09/465,739, filed on Dec. 17, 1999, now Pat. No. 6,262,406, which is a continuation-in-part of application No. 09/199,902, filed on Nov. 25, 1998, now Pat. No. 6,060,701, which is a continuation-in-part of application No. 09/169,523, filed on Oct. 9, 1998, now Pat. No. 6,008,483.

(51) Int. Cl.$^7$ ................................................. H05B 6/68
(52) U.S. Cl. ........................ 219/681; 219/683; 219/400; 219/702; 126/21 A
(58) Field of Search ................................ 219/710, 702, 219/720, 681, 682, 683, 685, 400, 401; 126/21 A; 99/451, 468, 474, 467, 325, 330

(56) References Cited

U.S. PATENT DOCUMENTS

| | | | | |
|---|---|---|---|---|
| 4,154,861 A | * | 5/1979 | Smith | 99/475 |
| 4,337,384 A | * | 6/1982 | Tanaka et al. | 219/681 |
| 4,396,817 A | * | 8/1983 | Eck et al. | 219/685 |
| 5,434,390 A | * | 7/1995 | McKee et al. | 219/681 |
| 5,525,782 A | * | 6/1996 | Yoneno et al. | 219/682 |
| 5,676,044 A | * | 10/1997 | Lara, Jr. | 99/330 |
| 6,060,701 A | * | 5/2000 | McKee et al. | 219/681 |

* cited by examiner

Primary Examiner—Philip H. Leung
(74) Attorney, Agent, or Firm—Amster, Rothstein & Ebenstein

(57) ABSTRACT

For residential use primarily, a compact quick-cooking convection oven for cooking a food product at least partially by hot gas flow, includes a housing defining (i) a cooking chamber having a top, a bottom and a support means therebetween and spaced above the chamber bottom for receiving and supporting a food product for cooking, and (ii) conduit means for providing gaseous communication outside of the cooking chamber upwardly from the chamber bottom to the chamber top. Associated with the cooking chamber are (i) adjacent the chamber top, directing means for directing gas flow from the conduit means downwardly onto a top of the food product on the support means, and (ii) adjacent the chamber bottom, return means for directing the gas flow from the cooking chamber into the conduit means. Flow means cause gas flow from the directing means via the conduit means. Control means independently vary without human intervention at least one of the effective volumetric flow rate of the gas flow into the cooking chamber and the temperature of the gas flow into the cooking chamber. The cooking means are selected from the group consisting of microwave radiant heating, non-microwave radiant heating, convection heating, and combinations thereof.

20 Claims, 3 Drawing Sheets

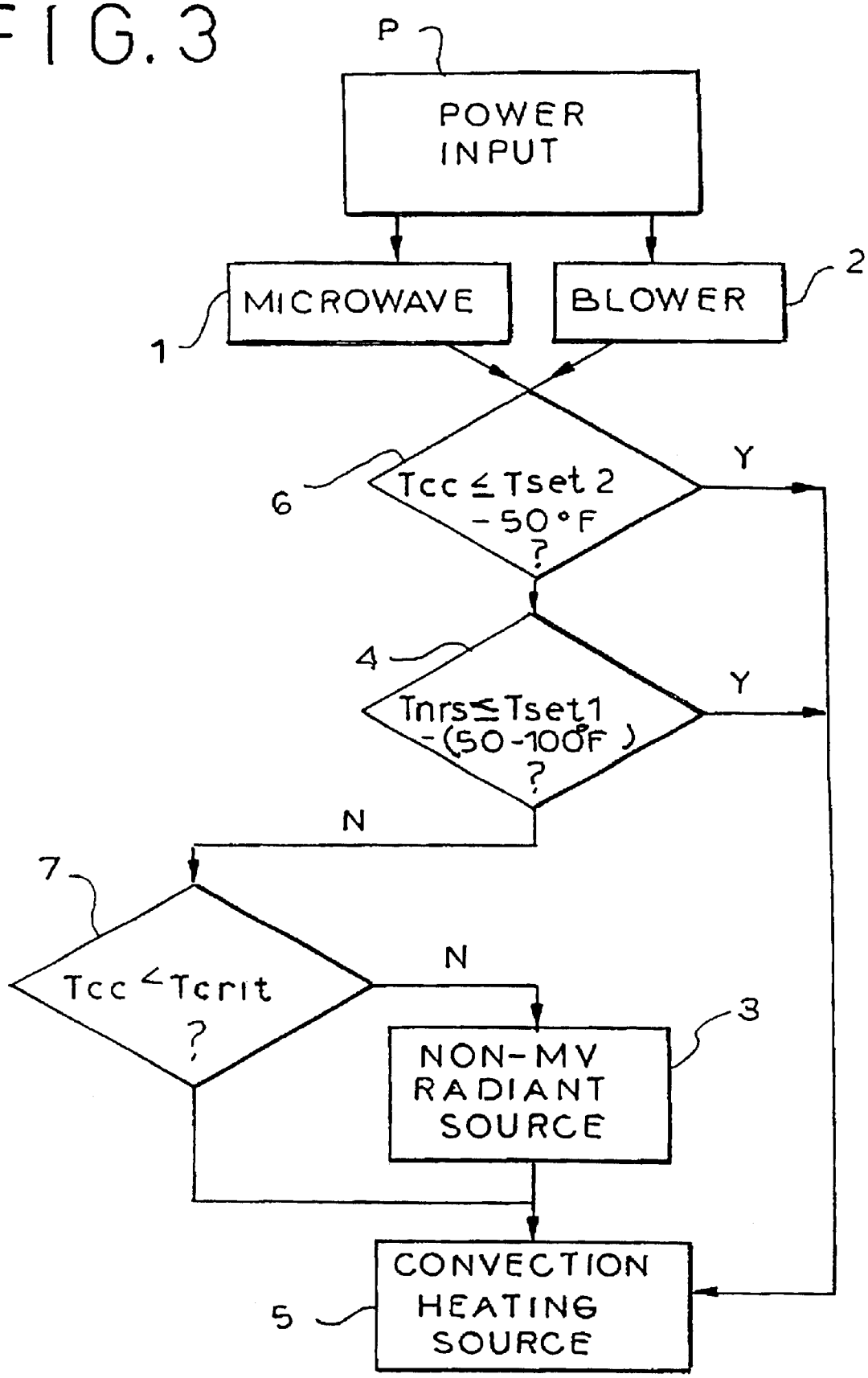

COMPACT QUICK-COOKING OVEN

CROSS-REFERENCE TO RELATED APPLICATIONS

This is a continuation-in-part of U.S. patent application Ser. No. 09/465,739, filed Dec. 17, 1999 now U.S. Pat. No. 6,262,406, itself a continuation-in-part of U.S. patent application Ser. No. 09/199,902, filed Nov. 25, 1998 now U.S. Pat. No. 6,060,701, itself a continuation-in-part of U.S. patent application Ser. No. 09/169,523, filed Oct. 9, 1998 now U.S. Pat. No. 6,008,483.

BACKGROUND OF THE INVENTION

The present invention relates to a compact quick-cooking convection oven and more particularly to such an oven which is suitable for residential use that is, use in a home as opposed to a commercial establishment.

Compact quick-cooking convection ovens designed primarily for use in commercial establishments are described in U.S. Pat. Nos. 5,254,823; 5,434,390; 5,558,793; and 5,927,265 (hereinafter "the cited prior art ovens"), which patents are incorporated herein by reference. Such ovens have proven themselves to be satisfactory in use in a variety of commercial establishments. However, they are not uniquely adapted to meet the requirements for residential use where considerations of available voltage, size, warm-up time, operating and purchase costs, and the like may be quite different.

For example, an oven according to the cited patents, for use in a commercial establishment, may have cooking chamber dimensions of 5" high by 18" deep×18" wide. By way of contrast, an oven suitable for residential use should preferably have cooking chamber dimensions about 12" high×14" deep×24" wide. As another example, an oven situated in a commercial establishment will generally have available to it three phase 220–240 voltage. By way of contrast, in a residence in the U.S.A. the available power for an oven will generally be single phase 220–240 voltage. As a further example, an oven for use in a commercial establishment may have a substantial warm-up period (for example, thirty to sixty minutes) since the oven is only turned on once during the work day (typically well before any customers are allowed to enter the establishment) and then kept on throughout the work day. By way of contrast, an oven suitable for use in a residence should have a very brief warm-up time (typically less than 10 minutes), since it will probably be turned off between meals (that is, about three times a day), with a warm-up time being required after each turn-on. For the above-mentioned reasons and numerous others, a residential oven must adjust or compromise various features in order to achieve the same highly desirable rapid cook time as the commercial oven of the cited patents.

The cited prior art ovens feature opposed primary energy flows with flows of hot gas striking the upper surface of a food product within the cooking chamber and with microwave energy being launched upwardly from the floor of the oven into the lower surface of the food product. To provide bottom side convection heat transfer, the hot gas flow is pulled around the sides of the food product (from the upper surface thereof) and across the bottom of the surface of the food product by a low pressure gas return passage located directly below the food product. This produces a hot gas "shroud effect" about the food product. The desired hot gas flow beneath the lower surface of the food product is accomplished by using a food product-supporting, microwave-transparent, ceramic cooking platter which forces the gas flow along the lower surface of the food product (the food product being supported above the cooking platter by standoffs) before the gas flow can pass downwardly through the hole(s) of the cooking platter and exit downwardly from the cooking chamber.

The microwave energy is launched from below and enters the food product only after passing through the microwave-transparent cooking platter.

To generate the desired bottom launched microwave feed into the cooking chamber, a microwave launch cavity and wave guide feed are located below the cook chamber. The launch cavity is roughly 9 inches in diameter and 5 plus (1½ wavelengths desired) inches high, with a mode stirrer located near the top of the cavity. This cavity typically projects about 1 inch into the cooking chamber cavity. It is isolated from the cooking process by an environmental seal which is a 9 inch diameter microwave-transparent window (high temp) and a grease/water seal to prevent water from entering into the microwave launch area. This resonant cavity couples the microwave energy primarily directly to the food, with secondary cavity coupling. As a result, the volume associated with the microwave launching/feed kit is large and has the effect of limiting the overall product packaging (e.g., oven size) and configuration (reduced cooking chamber size given the launch cavity volume). It also negatively impacts the cooking chamber design because it limits cleaning of the chamber bottom. Given the large diameter can, the microwave feed, and the plug seal, the current microwave kit is complex and expensive to manufacture. It also requires a mechanically/motor driven mode stirrer (motor/gearbox, shaft, microwave seal, and stirrer blade) located in the launch cavity. In addition, the construction of the launch cavity, its ¼ wavelength matching feed section, and the plug seal (microwave transparent window and environmental seal) is expensive.

In the cited prior art ovens the platter channeled the hot gas flow below the food and had three primary functional requirements: (1) to support the food, (2) to stand the food off the platter upper surface and thereby create an gas flow path between the platter and the food, and (3) to be microwave transparent so that the electromagnetic microwave energy launched from below the food can pass through the food support (platter). These requirements lead to the use of a cast ceramic platter which has the desired microwave transparency properties and can be formed with a number of standoffs used to create flow channel(s) defined by the platter upper surface and the bottom surface of a food item or cooking dish. In addition, the ceramic plate is cast with several holes which permit the gas flow to exit the flow channels to the blower return. This sophisticated cast ceramic part is expensive, fragile, and difficult to clean.

Further, the platter is complicated and difficult to produce. For the platter to provide adequate heat transfer to the food, a substantial portion of the gas flow must be channeled between the food and platter. To achieve this, the platter must have a tight fit (small clearance) to the oven walls in order to prevent the gas flow from by-passing around the platter and flowing directly to the gas return passage. Minimizing flow by-pass between the platter and the door, coupled with the door features for controlling microwave leakage, has resulted in the oven door covering the cook zone, such cook zone being defined by the platter at the bottom, the cavity roof at the top, and the oven walls therebetween. In essence, a two cavity oven results: an upper chamber containing the cook zone, and a lower zone below the upper chamber containing the gas return space. Such a two cavity construction is more expensive to produce, given the presence of the lower chamber or return gas volume which is not required for standard ovens. This lower chamber also results in additional cleaning difficulties for the user or consumer as the platter must be removed and the lower chamber cleaned of food or grease that may spill passing through the holes in the platter, or be deposited by the gas carrying grease/food particles flowing through space below the upper chamber.

In the cited prior art ovens, both the convection heating subsystem and the microwave heating subsystem are electrically powered, with the majority of the power expended being allocated to the convection heating elements. The primary energy flows are as follows:

1. Convection Top: Hot gas flow heat transfer onto the upper surface of the food;
2. Microwave Top: Microwave energy input that passes through the cooking platter, but "misses" the food, reflects off the upper surfaces of the cooking chamber, and becomes absorbed by the food through the food upper or side surfaces;
3. Convection Bottom: Convection heat flow across the lower surface of the food; and
4. Microwave Bottom: Microwave energy input from the bottom of the cooking chamber, through the platter, through the bottom surface of the food product, and into the center of the food product (primary microwave input).

In the cited prior art ovens, when the energy (power) flows of the convection gas and microwave energy are at full capacity, the total energy flow into the upper surface of the food product is about 1,900 watts (1,000–1,300 watts top convection and 400–600 watts top microwave) and the total energy (power) into the lower surface of the food product is also about 1,900 watts (500–700 watts bottom convection and 1,100–1,300 watts bottom microwave). Thus the energy split is roughly 2:1 for the convection energy, in favor of the top, and roughly 1:2 of the microwave energy in favor of the bottom. Actual distribution of the energy is a function of various factors including the geometry of the food, the geometry of the oven, etc. By having nearly the same quantity of energy delivered to both the top and bottom surfaces of the food, a uniform cook is obtained because the temperature profile is symmetric about a horizontal centerline—that is, isotherms are established in the food. This energy split in microwave and convection energy between the top and bottom food surfaces is critical to obtaining a finished food product which is both rapidly cooked and of high quality. The energy split minimizes the use (or need!) of internal heat conduction within the food being cooked.

The several power inputs identified above must be tailored in order to produce cooking which is both high speed and high quality. Thus, most foods are cooked on a dish or pan which retards moisture loss from the bottom surface of the food. Further, the bottom surface of the food typically requires only a modest level of browning relative to the browning level required at the upper surface of the food. By way of contrast, the upper surface of the food undergoes more significant moisture loss, and typically the food product is cooked with a greater level of browning.

Accordingly, the majority of the microwave energy is introduced into and through the bottom surface of the food, while less than half of the convection energy is applied to the bottom surface of the food. On the other hand, the majority of the convection energy is introduced into the upper surface of the food to provide moisture loss therefrom (through evaporative cooling of the upper surface) and browning thereof, while less than half of the microwave energy is applied to the top upper surface of the food in order to prevent excessive heating thereof. Thus the energy ratio of convection energy to microwave energy is roughly reversed depending on whether one considers the top surface or the bottom surface of the food.

More particularly, in order to generate the high level of heat transfer desirable at the upper surface or top of the food, impingement-style (that is, forced hot gas stream) heat transfer is used in order to dissipate the relatively cool stagnant gas layer directly above the food. To generate the desirably high heat transfer (as high as 35 BTU/hr/ft$^2$/°F), strong flows of the impingement gas must be used. To generate such strong flows easily and economically, a high velocity gas flow in combination with a modest gas pressure is used. This requires a blower which generates, for example, at least one horsepower at maximum operating conditions.

The cited prior art ovens present manufacturing and operational problems arising out of the "shroud effect" wherein hot gas flow launched from above is continually drawn down and around the food product so that it exits through the center of the cooking platter and thereby from the cooking chamber bottom, while microwave energy is launched upwardly from below the center of the cooking chamber bottom. For example, due to the co-location of the microwave feed into the cooking chamber bottom and the hot gas flow return path through the oven bottom to the blower, the oven bottom necessarily has a complex and expensive lower gas duct system. This follows from the fact that the gas that is drawn around the food product and exits the bottom of the cooking chamber is gathered up in an annulus with the center of the annulus being occupied by the microwave launching window.

Additional disadvantages arise from the point of view of the user. Thus the use of a single hot gasflow to provide both top and bottom surface convection heat transfer seriously limits the flexibility of food preparation as the top and bottom surface convection heat transfers cannot be independently controlled—for example, to permit additional bottom surface browning while reducing top surface browning. A further problem from the point of view of the user is that the central bottom of the cooking chamber is characterized by a region that is difficult to clean because access is limited. Spills, overflows and droppings from the food being cooked combine with grease carried by the gas flow to pass below the cooking platter and out of the cooking chamber into this access-limited and difficult-to-clean region.

The cited prior art ovens are thus subject to limitations and deficiencies in terms of manufacturing complexity and cost (due to the co-location of the central microwave feed and the gas return path to the blower), the difficulty of cleaning overflows and deposited grease (due to limited access), and the loss of cooking flexibility and control (due to the use of a single gas stream to provide both top and bottom surface convection heat transfer). Of special import to a compact oven suitable for residential use (and therefore subject to severe height constraints) is that a significant fraction of the cited prior art oven's vertical space allocation must be reserved for the lower gas return means, at the expense of the vertical space available to the cooking chamber interior.

Accordingly, it is an object of the present invention to provide a compact quick-cooking convection oven suitable for residential use.

SUMMARY OF THE INVENTION

It has now been found that the above objects are obtained in a residential version of a compact quick-cooking convection oven for cooking a food product at least partially by hot gas flow. For residential use primarily, the compact quick-cooking convection oven for cooking a food product at least partially by hot gas flow, comprises a housing defining (i) a cooking chamber having at top, a bottom and a support means therebetween and spaced above the chamber bottom for receiving and supporting a food product for cooking, and (ii) conduit means for providing gaseous communication outside of the cooking chamber upwardly from the chamber bottom to the chamber top. Associated with the cooking chamber are (i) adjacent the chamber top, directing means for directing gas flow from the conduit means downwardly onto a top of the food product on the support means, and (ii) adjacent the chamber bottom, return means for directing the gas flow from the cooking chamber into the conduit means. Flow means cause gas flow from the directing means into the return means and from the return means into the directing means via the conduit means. Control means independently vary without human intervention at least one of the effective volumetric flow rate of the gas flow into the cooking chamber and the temperature of the gas flow into the cooking chamber. The cooking means are convection heating and additional heating selected from the group consisting of microwave radiant heating (electromagnetic energy), non-microwave radiant heating (infrared heating), and combinations thereof.

The convection heating includes at least one convection heating element selected from the group consisting of (i) a convection heating element disposed in the return means, (ii) a gas combustion burner disposed below the food support, and (iii) combinations thereof.

The microwave electromagnetic energy (radiant) heating, when present, includes at least one microwave energy source for the cook chamber selected from the group consisting of (i) a microwave launcher disposed beneath the food support, (ii) a microwave launcher disposed in the top of the cooking chamber; (iii) a slotted microwave launcher disposed in opposed bottom sides of the cooking chamber, and (iv) combinations thereof.

The non-microwave radiant heating, when present, includes at least one non-microwave radiant heating element selected from the group consisting of: (i) an upper non-microwave radiant heating element disposed adjacent and below the directing means, (ii) a lower non-microwave radiant heating element disposed in the return means and distributed along the area below the food support such that at least a portion of the gas entering the return means is initially reheated by one non-microwave radiant heating element prior to flow under the remainder of the food support, and (iii) combinations thereof.

In a preferred embodiment, the oven additionally includes at least one catalytic element selected from the group consisting of (i) a catalytic element disposed in the return means, (ii) a catalytic element disposed in the conduit means, and (iii) combinations thereof.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 3 is a flowchart of the controller function in allocating the available power resource.

DETAILED DESCRIPTION OF THE PREFERRED EMBODIMENTS

Figure 1:
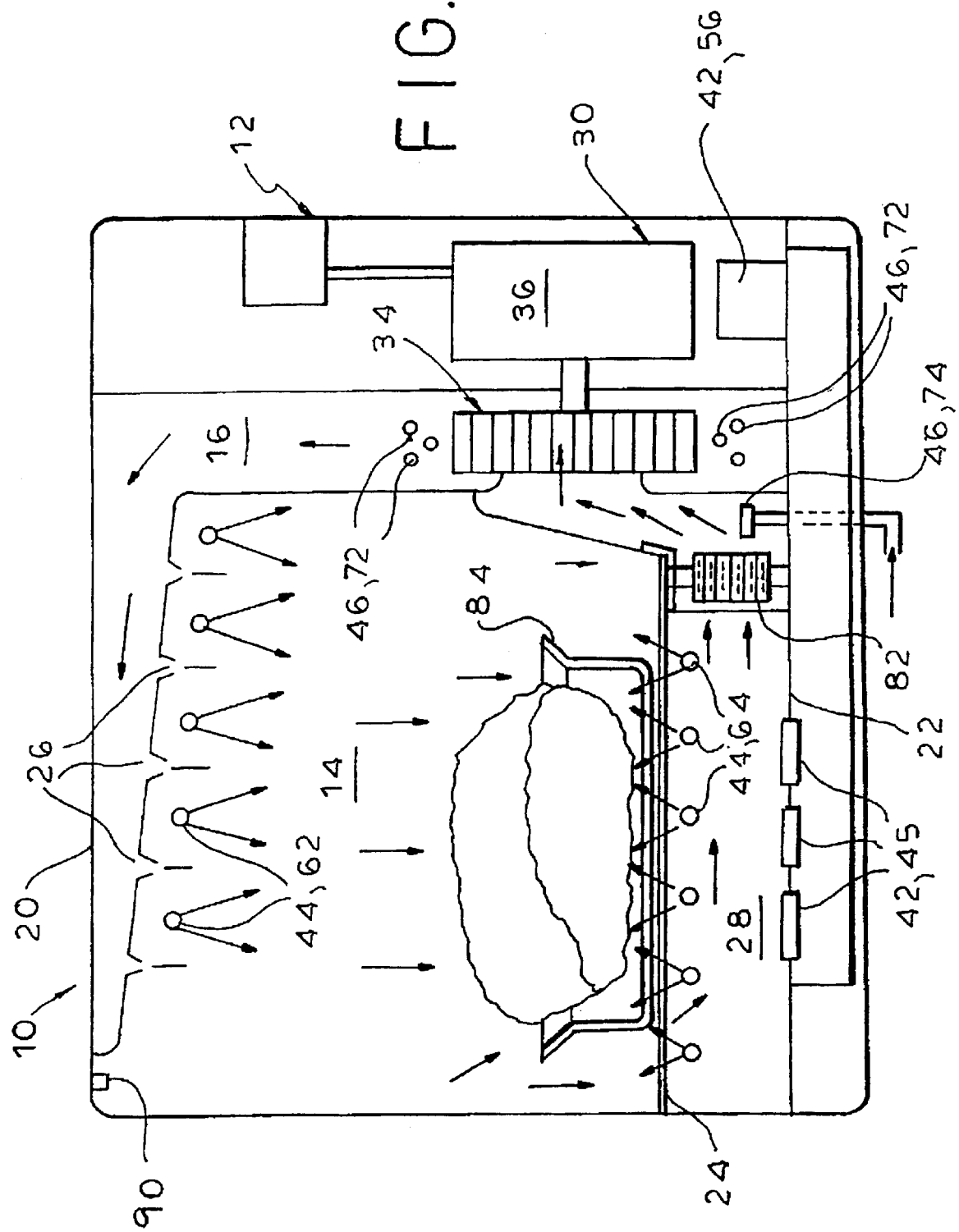
FIG. 1 is a schematic side elevational view, partially in cross-section, of an isometric view of an oven according to the present invention.
Figure 2:
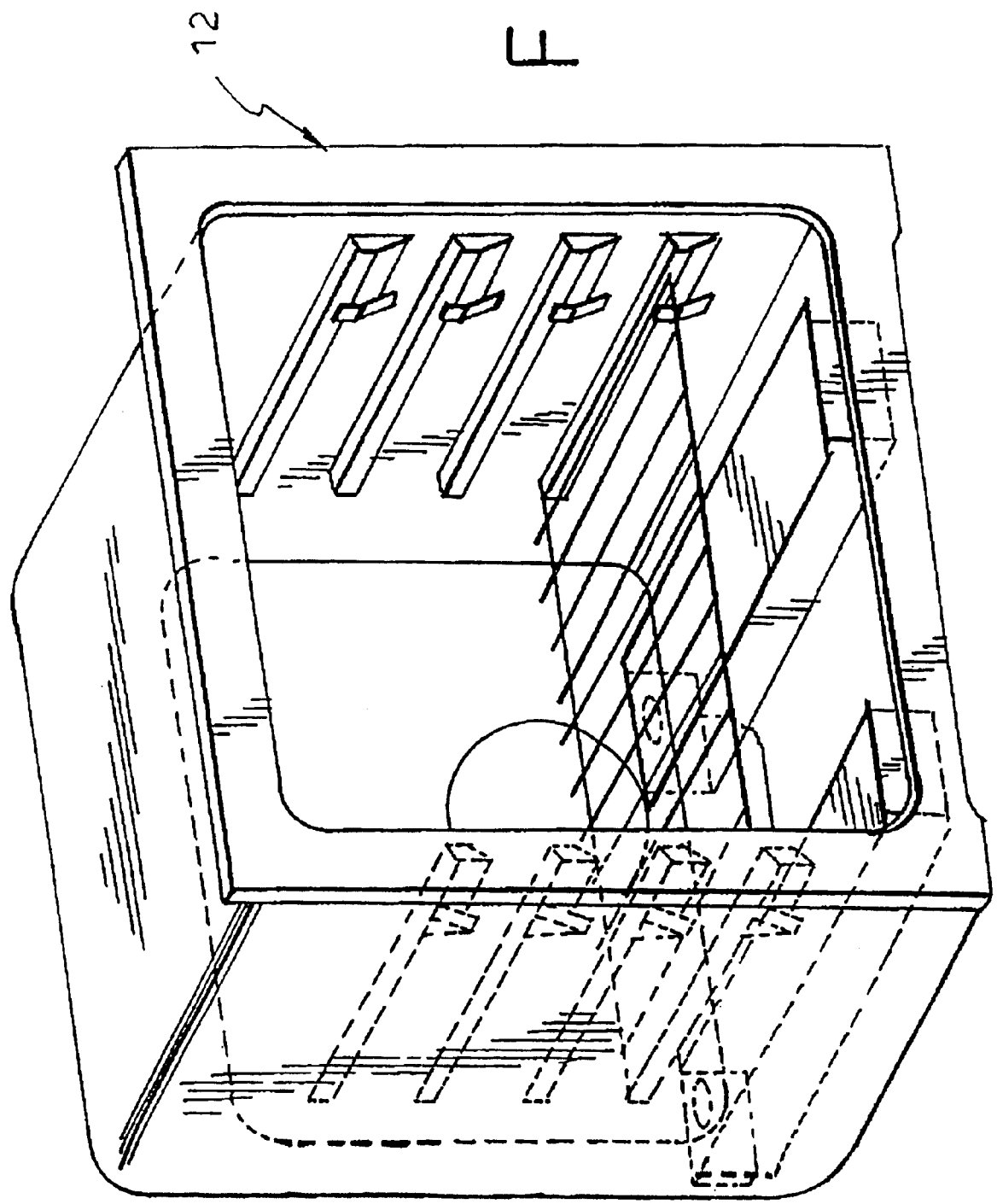
FIG. 2 is a schematic front isometric view of the oven.

Referring now to the drawing, and in particular to FIGS. 1 and 2 thereof, therein illustrated is a residential oven according to the present invention, generally designated by the reference numeral 10. The oven 10 is a compact quick-cooking convection oven for cooking a food product at least partially by hot gas flow. The oven 10 comprises a housing, generally designated 12, the housing 12 in turn defining a cooking chamber, generally designated 14, and a conduit means, generally designated 16.

The cooking chamber 14 has a top 20, a bottom 22, and a support means 24 therebetween, the support means 24 being spaced above the chamber bottom 22 for receiving and supporting a food product for cooking. The conduit means 16 provides gaseous communication outside of the cooking chamber 14 upwardly from the chamber bottom 22 to the chamber top 20.

Associated with the cooking chamber 14 are, adjacent the chamber top 20, directing means 26 for directing gas flow from the conduit means 16 downwardly onto a top of the food product on the support means 24 and, adjacent the chamber bottom 22, return passage or means 28 to direct the gas flow from the cooking chamber 14 into the conduit means 16.

Flow means, generally designated 30, are provided for causing gas flow from the directing means 26 into the return means 28 via the cooking chamber 14 and from the return means 28 into the directing means 26 via the conduit means 16.

The size of the cooking chamber 14 is determined by the size of the food product to be cooked therein and, in turn, determines to a large degree the overall size of the oven 10. Thus, very roughly speaking, a food product having the dimensions of 12"×16"×8" or 0.9 cubic feet requires a cooking chamber 14 of at least 15"×20"×10" or 1.8 cubic feet, and such a cooking chamber requires an oven 10 of 4 cubic feet.

The cooking chamber support means 24 not only supports the food product for cooking, but also allows the hot gas flow which contributes to the cooking thereof to pass downwardly into the associated return means 28 and thence into the conduit means 16. In contradistinction to the cited prior art ovens, in the present invention the hot gas flow initially contacting the upper surface of the food product is not constrained to proceed around the sides and across the bottom of the food product such that the hot gas flow engulfs the entire food product (e.g., with a shroud effect) and cooks both the top and bottom thereof simultaneously with the same hot gas flow.

The flow means 30 is preferably a fan or blower, including a blower wheel 34 and a blower motor 36, and causes gas flow successively from the directing means 26 into the return means 28 via the cooking chamber 14, and from the return means 28 back into the directing means 26 via the conduit means 16. Preferably the fan or blower 30 is a variable-speed device to enable independent control of the effective volumetric flow rate of the gas flow into the cooking chamber 14.

The cooking means includes a convection heating subsystem 46, and optionally heating subsystems selected from the group consisting of a microwave energy heating subsystem 42, a non-microwave radiant or thermal radiation heating subsystem 44 and combinations thereof.

The convection heating subsystem 46 includes at least one convection heating element selected from the group consisting of (i) a convection heating element 72 disposed in the return means 28, (ii) a gas combustion burner 74 disposed below the food support means 24, and (iii) combinations thereof.

The microwave radiant heating subsystem 42, when present, preferably includes at least one microwave radiant heating element consisting of a magnetron 56, a waveguide 54 and at least one $\frac{1}{2}\lambda_{(free\ space)}$ slot antenna 52 (in the preferred embodiment, three $\frac{1}{2}\lambda_{(free\ space)}$ slot openings 52 are included) in waveguide 54 for radiating microwave energy into cavity 14. In an alternative embodiment (not shown), a magnetron 56 is connected to a single waveguide positioned below cavity 14, and microwave energy passes from the single waveguide into cavity 14 by a rotating microwave antenna connected to the single waveguide and centrally disposed below the food support.

The non-microwave radiant or thermal radiation heating subsystem 44, when present, includes at least one non-microwave radiant heating element selected from the group consisting of (i) an upper non-microwave or thermal radiation (IR) radiant heating element 62 disposed adjacent and below the directing means 26, (ii) a lower non-microwave (IR), radiant heating element 64 disposed in the return means 28 and distributed along the area below the food support means 24 such that at least a portion of the gas entering the return means 28 is initially reheated by the heating element 64 prior to flow under the remainder of the food support 24, and (iii) combinations thereof.

In a preferred embodiment the oven 10 additionally comprises a catalytic element selected from the group consisting of (i) a catalytic element 82 disposed in the return means 28, (ii) a catalytic element (not shown) disposed in the conduit means 16, and (iii) combinations thereof.

Gas Flow Pattern

The gas flow pattern in the hybrid oven of the present invention (relying on microwave radiant heating, non-microwave radiant or thermal radiation heating, and convection heating) is as follows: Air (or other gas) passes downwardly through gas-directing holes in a transverse top plate 26 of the cooking chamber 14 and is optionally heated by top radiant heating elements 62. The gas-directing holes may be conventional impingement nozzles or simply apertures within the cooking chamber top plate 26. The hot gas flow impinges on the top and sides of a food supported on the food support means 24 (such as a conventional wire rack) to heat the top and sides of the food. The food may stand alone on the support means 24, or it may be disposed in a microwave-transparent pot or pan 84 supported on the support means 24.

Thereafter, the hot gas which contacts the top and sides of the food, as well as that portion of the hot gas which did not contact the food at all (but merely passed directly from the gas-directing holes of the cooking chamber top plate 26 to the wire-rack support means 24) is drawn through the wire-rack support means 24 by a vacuum created by the fan or blower of flow means 30. Some of this hot gas flow (that is, the hot gas which contacts the food and the hot gas which does not contact the food) is then reheated by non-microwave radiant or thermal radiation heating elements 64 disposed below the wire-rack support means 24. As a result of the blower-created vacuum, at least some of the reheated gas is caused to pass under the wire-rack support means 24 and thus indirectly across the bottom of the food. Accordingly, the bottom of the food is heated not only by the hot gas flow which is partially spent (because it has already been used to cook the top and sides of the food), but rather also by freshly reheated hot gas.

All of the hot gas drawn through the wire-rack support means 24 (whether reheated or not) passes through an optional catalyst or catalytic element 82 in the return means and into an intake. The gas within the return means 28 is then heated by convection heating elements 72 disposed within the conduit 16 and eventually returns reheated to the gas-directing holes of the cooking chamber top plate 26. Note that the gas flow within the cooking chamber 14 is substantially vertical, above the wire-rack support means 24, but is essentially horizontal below the wire-rack support means 24.

In a preferred embodiment, a microwave heating subsystem 42 supplies microwave energy through a pair of waveguides 54 having three $\frac{1}{2}\lambda_{(free\ space)}$ slot openings 52 in the upper surface of each waveguide 54, with the pgas of waveguides 54 being disposed beneath the wire rack support means 24 and contributing microwave energy to the food above the wire-rack support means 24. In addition, a non-microwave radiant or thermal radiation heating subsystem 44 has radiant heating elements 64 disposed beneath the wire-rack support means 24 to enable a browning of the bottom of the food (which is not obtainable through exclusively microwave heating or hot gas flow below the wire rack.

The use of a single gas stream, as taught in the cited prior art ovens, to provide both bottom- and top-surface convection heat transfer is a serious limitation relative to food preparation. While such a limitation may be overlooked in the context of "fast food" commercial preparation, the loss in cooking flexibility and control is less acceptable in the context of a residential oven. The oven 10 enables the uncoupling or independent control of the top heat transfer and the bottom heat transfer, thereby permitting, for example, additional bottom surface browning while the top surface browning is reduced.

Various other unique features of the oven 10 will now be discussed in detail hereinbelow.

Rapid Cook

The oven 10 of the present invention preferably employs an gas flow pattern which lends itself to a compact quick-cooking convection oven. More specifically, the gas flow is adapted to permit use of a standard wire rack 24 (rather than the special cooking platter of the cited prior art ovens) and to permit the gas return intake 28 to be disposed in a location which maintains the desired vertical hot gas flow pattern over the food upper surface.

To accomplish these functions, the oven gas flow is redesigned so that there is no "hot gas shroud" effect. A gas return means 28 is located below the cooking level (that is, below the wire-rack supporting means 24 or the bottom of the food product) to collect the hot gas after it has either bypassed the food entirely or passed the food upper surface (or sides). In view of the absence of the cooking platter which was used to maintain the "hot gas shroud" effect around the food, the intake of return means 28 must now be positioned so as to collect the entire hot gas flow (whether it contacts the food or bypasses the food). The location of the return means 28 also promotes a more vertical flow over the entire food product.

If the return means intake 28 is located at or above the wire rack centerline (that is, above the bottom surface of the food), the field of the hot gas impingement flow is thereby distorted from a substantially vertical direction (from the gas plate 26 at the top of the cooking chamber to the cooking platter) to one which non-uniformly sweeps the hot gas flow over the food product (as the flow proceeds from the gas plate 26, e.g., to the back wall of the cooking chamber). This results in both reduced and non-uniform heat transfer.

Accordingly, in the oven 10 according to the present invention, the intake or snorkel of the gas return means 28 is located below the cooking level so that it collects the hot gas flow only after it has passed the food. In particular, the intake for the gas return means 28 is preferably located vertically adjacent (but spaced above) the cooking chamber floor, deeply adjacent (but forwardly of) the cooking chamber back wall, and horizontally adjacent the center of the cooking chamber. Preferably the intake or snorkel of return means 28 is located forwardly about 25–50% of the cooking chamber depth from the cooking chamber back wall and below the wire rack 24, thereby to result in a substantially vertical gas flow contacting the food product upper surface. In addition, the bottom edge of the intake or snorkel is preferably elevated slightly (about one half inch) above the cooking chamber floor to reduce food droppings, food spills, grease and the like from entering into the duct.

This disposition of the gas return means intake 28 assures that the desired vertical gas flow pattern is substantially maintained until the hot gas flow has passed the food and is ready for re-circulation. Where non-microwave radiant or thermal radiation heating elements 64 are disposed in the return means 28 below the cooking level, the reheated gas passing through the return means 28 preferably provides the necessary bottom side convection heat transfer to the food and therefore eliminates the need for a shroud effect.

Preferably the catalyst 82 is located slightly downstream of the intake or snorkel of return means 28 and upstream of conduit 16 to clean the gas flow before it passes through the blower wheel 34 and conduit 16 (thereby to prevent grease accumulation on blower wheel 34 and conduit means 16).

Radiant Bottom Heating

The oven 10 of the present invention preferably employs at least one rapid response, non-microwave radiant heating (thermal radiation) element disposed in a return means 28 above the cooking chamber floor 22 to provide convection heat transfer to the bottom surface of the food product. The use of a bottom non-microwave radiant heating element enables the food to be supported on a standard wire rack 24, rather than a ceramic platter, since a hot gas shroud effect is no longer required to provide convection heating of the bottom surface of the food product. Instead, the snorkel or intake of return gas duct 28 is located at or below the wire rack 24 and collects the hot gas flow after it bypasses the food product entirely or passes over the upper surface or top of the food product (and optionally the sides thereof). This enables the cooking chamber 14 to have both a smooth floor without recesses and also independent convection heating of the lower surface or bottom of the food product.

The bottom non-microwave radiant heating element 64 is preferably located 2–4 inches below the wire rack or cooking level, and includes a variable power input capable of providing at least two average power levels (for example, one for browning, and one for baking).

Preferably, the maximum thermal radiant heat transfer at the bottom of the food product in the present invention should equal or exceed the convection heat transfer of the hot gas flow passing between the platter and the bottom side of the food product or cooking dish in the cited prior art ovens. The maximum convection heat transfer associated with this flow (assuming a flat plate or flat food bottom) is about 12–15 BTU/hr/ft$^2$/° F. To achieve this level of heat transfer, the bottom radiant heating element 64 desirably provides 1,000–2,500 watts depending upon the size of the oven and the desired cook speed and is operated in the 1000° F. surface temperature vicinity.

In order to reduce the heater response time during cooking, the lower radiant heating element 64 may have a warm or hold state during preheating or between cooking operations. In its warm or hold state, the radiant output of the element 64 is relatively small (typically below 800° F.), but yet at a high enough temperature such that the time required to reach the desired radiant output for a cooking operation is preferably less than half of the recipe cook time (that is, the cook time specified in the recipe for a particular food cook operation).

To simplify control of the heating element 64 for a particular cook recipe, the temperature set point for the element 64 may be held constant throughout the cook cycle. This is particularly effective where sheathed electrical elements are used as they have a relatively large thermal time constant so that their heat-up times are long relative to the duration of the event requiring that temperature within the cook recipe. On the other hand, a lightweight, unsheathed, rapid response radiant element permits modulation of the radiant output on more of a real-time basis so that the element temperature may be varied over different events within the cook recipe.

The use of a bottom non-microwave radiant or thermal radiation heating element 64 enables the oven to perform a conventional bake operation (that is, without microwaves or with only low microwave input) for recipes that are either hard to accelerate while still achieving appropriate quality or are cooked so infrequently that it is not worth resetting the recipe for rapid cooking (that is, with the microwave energy input). On the other hand, combined use of the bottom non-microwave radiant heating element 64 and the microwave energy input 42 may be used to reduce the time required for a conventional (non-microwave) bake by as much as 50% in cooking time.

The use of a bottom non-microwave radiant heating element 64 further enables the oven to perform a high temperature self-cleaning operation without also requiring operation of the blower or convection heaters at elevated temperatures (such as 600° F.), thereby to significantly reduce the requirement that the blower be able to operate at extreme conditions and accordingly enabling use of a less expensive and more reliable blower.

In order to provide a conventional residential oven cooking operation (with no or low microwave input), the bottom non-microwave radiant heating element 64 can be used in a low radiant energy output mode, with the convection blower either off or operating at low gas flows (e.g., 50 CFM) to reduce the demands on the blower. The bottom non-microwave radiant or thermal radiation heating element 64 eliminates the need (found in the cited prior art patents) to operate the oven at high gas flow conditions in order to produce sufficient bottom browning of the food being cooked, because of radiant heat transfer which is independent of air flow under the food product.

The reduced gas flow conditions significantly reduce the entrainment of grease particles and vapors which otherwise occurs when the gas flow scrubs grease from the surface of the food being cooked. As the rate of grease emission is roughly proportional to the cook speed, the operation of the oven at lower gas flow conditions reduces the grease generation and thus both the impact of the grease on the flavor of the food being cooked and the build-up of the grease on the oven interior (which build-up otherwise requires periodic cleaning to prevent burning of the built-up grease).

Most importantly, the provision of the element 64 eliminates at least one of the limiting factors for cook time reductions for many foods that require additional heat transfer at the end of the cycle for browning of the food bottom surface. Because bottom side heating (that is, the non-microwave radiant heating of the bottom of the food) is performed by the element 64 independently of the top side heating, it becomes possible to provide adequate bottom side browning for many products (for example, pizza, broiled chicken, etc.) which were limited in the amount of bottom side browning by the convection flow of the cited prior art ovens using a hot gas shroud effect (in which the hot gas stream passed over the upper surface of the food prior to passing over the bottom surface of the food). In other words, in the oven 10 of the present invention, the amount of heat transfer which can be applied to the food bottom is independent of the amount of heat transfer that can be applied to the food top (the latter necessarily being limited in order to prevent overcooking of the food top).

In addition to the improved control of the heat transfer for bottom side cooking of the food (because it is independent of the top side cooking of the food) and the enhanced oven functionality (the ability to operate as a traditional residential heating oven and as a high temperature self-cleaning oven), the presence of a bottom non-microwave radiant heating element 64 enables new parameters for the oven bottom. Indeed, a significant advantage of the use of a bottom non-microwave radiant heating element 64 is that the oven may now have a smooth floor without recesses. Thus, the addition of the radiant heat source below the cooking rack position has greatly simplified the oven design and fabrication as compared to the cited prior art ovens and greatly facilitated the oven cleaning operation.

As is well recognized in the art, a radiant energy source is typically less than 50% efficient—that is, less than half the energy or power applied to the radiant source will result in radiant heat transfer to the product. The balance of the energy or power applied to the element is advantageously used in the present invention to provide additional heat for bottom convection heat transfer. Thus, the radiant heat source provides a major proportion of the convection heating (using the energy or power which is not converted into radiant heat transfer to the product), with the main convection heater 27 in conduit 16 providing only a minor proportion or make-up heating for the convection flow.

In order to generate the significant bottom side convection heat transfer, the gas return 28 is located below the wire rack 24 or other food support so that a portion of the reheated gas flow therefrom passes under the food product. Preferably, the entrance to the gas return is substantially the width of the oven cavity and projects forwardly from the rear wall 17 of the oven cavity by the depth of conduit means 16 plus the depth of catalytic element 82. Thus the bottom side convection heating according to the present invention provides up to half of the combined bottom heat input (from both radiant and convection heating) into the product. As the radiant source temperature increases (typically over 1,000° F.), the contribution of the convection heating at a maximum flow (about 250–330 CFM) is less than half of the total combined bottom side heat transfer.

Power Control

Obviously the ability to cook rapidly is based upon the ability to apply large power flows into the product being cooked, and the ability to provide such large power flows into the product in turn requires correspondingly large power flows into the oven heating sources. For example, a rapid cook oven—which is five times faster than a standard oven requiring about 800–900 watts on average to be delivered to the food (depending, of course, on the food type)—requires about 2500 watts of power to the oven, while a seven-times-faster oven requires about 3500 watts of power to the oven, and a ten-times-faster oven requires about 5000 watts. Further increasing the power requirement of the oven are the various inefficiencies associated with the power delivery functions—for example, about 60% conversion efficiency for a microwave sub-system and typically less than 70% conversion efficiency for a convection sub-system. Thus the power requirements of an oven can easily exceed the above-mentioned values by about 50%.

Accordingly, if each of the various power elements is allowed to be energized simultaneously, the value of the total power input requirement of a rapid cook oven can be nearly doubled over the value of the total power output that the food requires to be delivered to it for rapid cooking. By way of example, the seven-times faster oven might require an input of more than 7,000 wats of power if the various power elements were energized at the same time to satisfy the cooking recipe directions (e.g., the amount of microwave energy needed) and the oven temperature set. Such a large power draw would be a major impediment to oven installation in the home and even in commercial establishments where the power supply is limited or standardized at particular levels (e.g., 25 amps at the 240 volt single phase typical for some European restaurants). Accordingly, it is essential that the controller be able to maintain the speed of cooking and food quality sought for the oven while at the same time managing the distribution of the available power.

To achieve this, in another aspect of the present invention, the controller of the present invention adheres to the following priorities in the allocation of power:

1. As the first level priority (and without regard to the lower priorities), all microwave energy and gas flow requirements are met. Thus, even at the expense of other, lower priorities, the energy requirement of the microwave sub-system (including the magnetron cooling system) and the blower output (blower wheel speed) are maintained at the desired level.

2. As the second level priority, the non-microwave radiant source (heating element) is maintained within 50° F.–100° F. of the desired (set) temperature. (Thus, where the heating element set point is 1000° F., the radiant source temperature is maintained no lower than 900° F.–950° F.) If necessary to achieve this second level priority, the power input to the non-microwave radiant element may be modulated—for example, via a proportional controller or rapid on/off control—such that a lower average current draw suffices. (It will be appreciated that while the non-microwave radiant hearing element is an energy source for the convection flow within the cooking chamber, it is insufficient to provide all of the convection heat input; accordingly, the balance of the convection heat input is provided by the convection heaters.)

3. As the third level priority, the convection heating element is supplied with appropriate power. This third level priority receives full power only when the same is available—that is, not required to meet the first or second level priority requirements. The convection heating element thus receives full power only when the other elements (microwave generators, blower, and non-microwave radiant heating elements) do not exhaust the available power input to the oven, even though this may mean that the convection heating element receives power only when the other elements are not requiring their maximum power input.

The sole exception to the third level priority criterion is that, when and while the cooking chamber temperature (as measured) is, for example, 50° F. lower than the desired temperature set point of the cooking chamber, the convection heating element e3ither takes priority or the two share the available power input.

As with the non-microwave radiant heating element, the power input to the convection heating element may be modulated via a proportional controller or rapid on/off controller so that the power draw measures a lower average current draw.

To summarize, referring now to FIG. 3, the controller first meets from the power input (P) the requirements of the microwave elements (MW) (see Box 1) and the gas flow (blower) (see Box 2), then meets the needs of the non-microwave radiant heating element (see Box 3) at least to the extent that it is 50° F.–100° F. lower than the desired or set radiant source temperature $T\ set_1$ (Decision Box 4), and finally provides any remaining power to the convection heating element (see Box 5) when the cooking chamber temperature is within 50° F. of the desired or set cooking chamber $T\ set_2$ (Decision Box 4). However, the convection heating element (Box 5) takes priority over the non-microwave radiant heating element (Box 4) or shares with it the second level priority power input when the cooking chamber temperature is lower than a critical level $T_{crit}$ (Decision Box 7) needed for convection cooking.

Hot Gas Impingement Flow

The oven 10 according to the present invention preferably employs a unique impingement flow geometry which permits an impingement nozzle array to be centered over the cooking area, where the array comprises a few large diameter nozzles (e.g., about 10 nozzles with having diameters of about ⅝ in.), compared with the conventional prior art which teaches the use of a large number of low diameter nozzles (e.g., up to 60 nozzles with diameters of about ⅜ in). The impingement style heat transfer is characterized by a thermal coefficient greater 18 BTUs/hr/ft²/"F) due to the following factors: (1) the total gas flow flux (CFM/ft² cooking area) or average flow flow velocity through the oven is at least 200 feet/minute (CFM/ft²); (2) the hot gas exiting the impingement nozzles has an average speed of at least 8,000 feet/minute; (3) the nozzle diameters are at least ⅝ in; and (4) the gas nozzle pitch (that is, the spacing between nozzles in the array) is less than 2 in. By way of contrast, in the cited prior art ovens, the average flow velocity was less than 130 CFM/ft², the average speed of gas leaving the impingement nozzles was only 5,000–6,000 ft/minute, the nozzle diameters were only ⅜ in.

4. In the cited prior art ovens, the hot gas flow had to pass through the single large aperture or multiple smaller apertures in the platter supporting the food, thereby necessitating the use of a relatively large and powerful blower to overcome the pressure drop through the platter apertures(s). Further, the uneven nature of the bottom of the cooking chamber across the bottom surface (with its microwave can hump) as well.

5. The unique impingement flow geometry of the present invention enables the attainment of a large convection or hot gas impingement heat transfer rate (due to a coefficient greater than 18 BTU/hr/ft²/° F. even at distances from the cooking level (that is, the wire racks supporting the food) to the impingement gas plate greater than 10 inches. In the cited prior art ovens the spacing between the cooking level and the gas plate was typically no more than 6 in., thus limiting severely the space available for the cooking in the cooking chamber of large food products (e.g., turkey, rolled roast, etc.). Thus the increase in spacing from the conventional 6 in. to over 10. in. increases the versatility and functionality of the oven according to the present invention.

6. In the present invention, the blower is utilized more efficiently (and thus a smaller, less powerful and less expensive blower may be used than in the cited prior art ovens) since the hot gas flow can easily pass through the openings of the wire rack (which is used instead of the platter of the cited prior art ovens) and over the smooth bottom of the oven floor (which does not have the irregular configuration of the cited prior art ovens), thereby reducing the pressure drop which must be overcome by the lower.

Thus, in combination, the radiant heat source and the wire rack eliminate the two chamber cavity construction and thereby result in a less complicated and less costly item to fabricate. In addition, the oven has a single open cavity that is easily accessible for cleaning. The radiant heat source positioned below the food, coupled with a wire rack suitable for use in a microwave environment for supporting the food, produces a low cost robust means of supporting the food, supplying energy to the bottom surface of the food, and permitting the gas to flow and return to the blower.

Microwave Waveguide System

The oven 10 of the present invention preferably employs at least one waveguide system 42 consisting of a waveguide 54, a magnetron 56 attached to a first end of waveguide 54, and preferably three $\frac{1}{2}\lambda_{(free\ space)}$ slot openings 52 in the top of waveguide 54.

At least one $\frac{1}{2}\lambda_{(free\ space)}$ slot opening 52 is incorporated into each waveguide 54, and in the preferred embodiment there are three $\frac{1}{2}\lambda_{(free\ space)}$ slot openings 52 in each waveguide 54. The food is preferably supported on a standard wire rack 24. The microwave energy is broadcast into the cavity uniformly over the length of the slot feed. In the preferred embodiment, there are two parallel waveguides 54, one adjacent each side of the cooking chamber. Each has a separate magnetron 56 connected thereto, and each has three $\frac{1}{2}\lambda_{(free\ space)}$ slot openings 52 incorporated into the top surface thereof. In an alternative embodiment (not shown), a single magnetron may supply microwave energy to two waveguides 54, through an additional waveguide (not shown).

Each waveguide 54 includes a series of $\frac{1}{2}\lambda_{(free\ space)}$ slot openings 52 which couple both E and H fields into the cavity. No stirrer is required as the slots have a very constant energy coupling pattern into the cavity (resonant). The slots are covered with small strips of ceramic material or other suitable microwave-transparent material. The slot openings are preferably above the level of cook chamber floor 22 in order to reduce potential contamination of the slots from food spills in the oven or grease produced by the cooking process.

Optional Radiant Top Heating

The oven 10 of the present invention preferably employs at least one rapid response, non-microwave radiant heating (thermal heating) element 62 disposed just below the gas plate 26 of the cooking chamber 14, and preferably a plurality of such elements 62. The food, supported on a standard wire rack 24, now has its upper surface provided with a hot gas impingement (convection) heat transfer of lower gas flow volume. The top convection heat transfer is maintained at the level necessary to add convection heat and reduce the moisture level of the top of the product because the top non-microwave radiant heating element 62 adds the additional heat transfer to fill the heat transfer gap created by the reduction in the maximum impingement level (that is, the maximum gas flow rate).

Thus, the maximum radiant heat transfer from the top non-microwave radiant heating element 62 must equal or exceed the gap between the maximum impingement heat transfer level of 22–27 $BTU/hr/ft^2/°$ F. and the lower impingement heat transfer in the 18 $BTU/hr/ft^2/°$ F. range which is the maximum convection heat transfer that can be produced by the reduced sized blower 30 (described hereinabove). To achieve this level of heat transfer, the top radiant heating element 62 will preferably provide 1,000–2,500 watts, depending upon the oven size and the desired rapid cook speed. In order to reduce the response time of the top radiant heating element during cooking, the top radiant heating element 62 may have a warm or hold state (that is, a reduced level heating) during pre-heat or between cooking operations.

More particularly, a hot gas flow reduction of 20% lowers the required power of the blower motor in half since the blower power requirement is proportional to the cube of the flow rate. Accordingly, the blower or flow means 30 (including the blower wheel 34, the blower motor 36, and the blower motor controller) is correspondingly smaller and less expensive. Further, the noise associated with the flow rate may be decreased by 8–10 decibels due to the reduction in gas flow and flow impingement velocities.

The top non-microwave radiant heating element 62 further enables the oven to operate in a conventional broil mode for foods that are best cooked using a top browning effect, without the moisture removal level associated with a hot gas impingement broil.

As will be appreciated by those skilled in the art, the top radiant heating element 62 may also be used as part of a self-cleaning cycle of the oven.

Gas Burner Subsystem

The oven 10 of the present invention preferably employs a direct-fired gas burner subsystem which can replace as much as 65% of the total electrical power load of the oven. Such a hybrid oven results in a significant reduction in the cost of operating the oven since, for comparable BTU levels, the price of natural gas is only a fraction (e.g., ¼) the price of electricity, depending on location. This feature further enables the use of the oven in residential locations that lack sufficient electrical service to accommodate an all-electric oven. Because more power (and in particular non-electrical power) is available from the burning of gas, a higher oven temperature set point may be used to provide more rapid cooking with little, if any, recovery time being required between cook cycles. Most significantly, the use of a gas burner subsystem frees up more of the electrical power input for use in operating the remaining electrical aspects of the oven 10.

The gas burner subsystem fits within the existing chassis of the residential oven 10, preferably in the space below the wire rack 24. It should accommodate an input gas rate less than 1.5 times the electric power rating of the convection heating element it replaces. Typically, a 6 to 1 turndown in the firing rate is used. The gas consumption rate should be variable between the maximum and minimum input rates. The response rate of the gas burners should be comparable to the microwave subsystem (e.g., provide heating within five seconds of ignition).

The direct-fired gas combustion subsystem is located on the lower pressure side of the flow means 30, preferable between the catalyst element 82 in the return means 28 and the conduit 16. Subsequent passage of the gas through the blower 30 ensures that the products of the combustion are well mixed with the return gas (from the return means 28) prior to being reintroduced into the cooking chamber 14, thereby to provide a uniform temperature to the hot gas flow entering the cooking chamber 14.

When a direct-fired gas burner subsystem is used, the catalyst cooking element 82 should be configured to handle both the oxidation components (e.g., CO) and the reduction components (e.g., $NO_x$), thereby to reduce not only the grease of vapor/particles in the gas flow, but also to eliminate or reduce chemical components which produce an off-color in poultry ("pink chicken") and are typically associated with direct-fired ovens.

As the gas input rate to the burner subsystem will vary with the gas flow characteristics of the oven 10, preferably a modulatable burner is used. The burner may be modulated either step-wise or continuously. The ability to control the burner gas input rate requires both "flame ignition" and "proof-of-flame" sensors to be located within the oven cavity 14 or return means 28, such oven cavity or return means itself containing microwave energy. Extracting a "proof-of-flame" signal in a microwave environment is difficult since the probe acts as an antenna for the microwave power and corrupts the signal. In order to isolate the microwave energy from the combustion environment, the intake or snorkel of the return means 28 is preferably shielded against microwave contamination. The gas burner subsystem is preferably disposed downstream of the catalyst element 82 and in the return means 28. The catalyst element 82 is preferably configured as a microwave choke comprising coated corrugated stainless steel plates with a corrugation height (preferably 0.060 inch) and a depth (preferably 1.0 inch) which attenuates the microwave power and thereby protects the downstream gas burner subsystem from microwave contamination.

The gas burner is typically fed by a mixing tube into which natural gas and combustion (ambient) gas are introduced under the control of the flame ignition and proof-of-flame sensor.

It will be appreciated that, where a gas supply is available, the direct-fired gas burner subsystem may be retrofit into existing electric ovens to replace all or some of the existing electric heating elements, thereby eliminating as much as two thirds of the electrical load of such ovens (for example, reducing the electric load from 6.0 kilowatts to 2.0 kilowatts at about 10 amperes at 208 volts).

Conventionally heat transfer has been considered to operate through three mechanisms: conduction, convection and radiation. For the purposes of this specification, microwave energy will be considered to be a form of radiation (which, of course, it is) even though its function is achieved through energization of water molecules without regard to any temperature differential between the radiant energy source and the water molecules (and, to some extent, by conduction from one water molecule to another). Thus, herein "radiant energy transfer" or "radiant heating" is described as being either "microwave radiant heating" or "non-microwave radiant heating".

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A compact quick-cooking convection oven for cooking a food product, comprising:
 (A) a compact housing defining a quick-cooking chamber having a top, a bottom and a support means therebetween and spaced above said chamber bottom for receiving and supporting a food product for cooking, and conduit means for providing gaseous communication outside of said cooking chamber upwardly from said chamber bottom to said chamber top;
 (B) associated with said cooking chamber, adjacent said chamber top, directing means for directing gas flow from said conduit means downwardly onto a top of the food product on said support means, and, adjacent said chamber bottom, return means for directing the gas flow from said cooking chamber into said conduit means;
 (C) flow means for causing gas flow from said directing means into said return means and from said return means into said directing means via said conduit means;
 (D) control means for independently varying without human intervention at least one of the effective volumetric flow rate of the gas flow into said cooking chamber and the temperature of the gas flow into said cooking chamber, without regard to humidity and without human intervention; and
 (E) cooking means selected from the group consisting of microwave radiant heating, non-microwave radiant heating, convection heating, and combinations thereof;
  (i) said microwave radiant heating, when present, including at least one microwave radiant heating element selected from the group consisting of:
   (a) a microwave heating system including a waveguide, a magnetron connected to said waveguide and a microwave antenna centrally disposed beneath said food support and mounted in said waveguide,
   (b) a microwave heating system including a waveguide, a magnetron connected to said waveguide and at least one $½\lambda_{(free\ space)}$ slot opening disposed beneath said food support and mounted in said waveguide, and
   (c) combinations thereof;
  (ii) said non-microwave radiant heating, when present, including at least one non-microwave radiant heating element selected from the group consisting of:
   (a) an upper non-microwave radiant heating element disposed adjacent and below said directing means,
   (b) a lower non-microwave radiant heating element disposed in said return means and distributed along the area below said food support such that at least a portion of the gas entering said return means is initially reheated by one said non-microwave radiant heating element prior to flow under the remainder of said food support, and
   (c) combinations thereof;
  (iii) said convection heating, when present, including at least one convection heating element selected from the group consisting of:
   (a) a convection heating element disposed in said return means;
   (b) a gas combustion burner disposed below said food support, and
   (c) combinations thereof.

2. The oven of claim 1 additionally including at least one catalytic element selected from the group consisting of:
 (A) a catalytic element disposed in said return means,
 (B) a catalytic element disposed in said conduit means, and
 (C) combinations thereof.

3. The oven of claim 2 additionally including a catalytic element disposed in said return means.

4. The oven of claim 2 additionally including a catalytic element disposed in said conduit means.

5. The oven of claim 2 wherein said cooking means comprises:
 (A) said microwave heating system including a waveguide, a magnetron connected to said waveguide and a microwave antenna centrally disposed beneath said food support and connected to said waveguide,
 (B) said lower non-microwave radiant element in said return means, and
 (C) said convection heating element in said return means.

6. The oven of claim 1 wherein said cooking means includes a microwave heating system including a waveguide, a magnetron connected to said waveguide and a microwave antenna centrally disposed beneath said food support and connected to said waveguide.

7. The oven of claim 1 wherein said cooking means includes a microwave heating system including a waveguide, a magnetron connected to said waveguide and at least one $½\lambda_{(free\ space)}$ slot opening disposed beneath said food support and mounted in said waveguide.

8. The oven of claim 1 wherein said cooking means includes an upper non-microwave radiant heating element disposed adjacent and below said directing means.

9. The oven of claim 1 wherein said cooking means includes a lower non-microwave radiant heating element disposed in said return means and distributed along the area below said food support such that at least a portion of the gas entering said return means is initially reheated by one said non-microwave radiant heating element prior to flow under the remainder of the food support.

10. The oven of claim 1 wherein said cooking means includes a convection heating element disposed in said return means.

11. The oven of claim 1 wherein said cooking means includes a gas combustion burner disposed below said food support.

12. A compact quick-cooking convection oven for cooking a food product at least partially by hot gas flow, comprising:
 (A) a compact housing defining a quick-cooking chamber having a top, a bottom and a support means therebetween and spaced above said chamber bottom for receiving and supporting a food product for cooking, and conduit means for providing gaseous communication outside of said cooking chamber upwardly from said chamber bottom to said chamber top;
 (B) associated with said cooking chamber, adjacent said chamber top, directing means for directing gas flow from said conduit means downwardly onto a top of the food product on said support means, and, adjacent said chamber bottom, return means for directing the gas flow from said cooking chamber into said conduit means;
 (C) flow means for causing gas flow from said directing means into said return means and from said return means into said directing means via said conduit means;

(D) control means for independently varying without human intervention at least one of the effective volumetric flow rate of the gas flow into said cooking chamber and the temperature of the gas flow into said cooking chamber, without regard to humidity and without human intervention; and (E) cooking means selected from the group consisting of microwave radiant heating, non-microwave radiant heating, convection heating, and combinations thereof;
  (i) said convection heating including at least one convection heating element selected from the group consisting of:
    (a) a convection heating element disposed in said return means,
    (b) a gas combustion burner disposed below said food support, and
    (c) combinations thereof.

13. The oven of claim 1 wherein (A) said microwave radiant heating, when present, includes a waveguide, a magnetron connected to said waveguide and at least one $½\lambda_{(free\ space)}$ slot opening disposed beneath said food support and mounted in said waveguide, and (B) said non-microwave radiant heating, when present, includes at least one non-microwave radiant heating element selected from the group consisting of:
  (i) an upper non-microwave radiant heating element disposed adjacent and below said directing means,
  (ii) a lower non-microwave radiant heating element disposed in said return means and distributed along the area below said food support such that at least a portion of the gas entering said return means is initially reheated by one said non-microwave radiant heating element prior to flow under the remainder of said food support, and
  (iii) combinations thereof.

14. The oven of claim 12 is additionally including at least one catalytic element disposed in said return means.

15. The oven of claim 14 additionally including a catalytic element disposed in said return means.

16. The oven of claim 14 additionally including a catalytic element disposed in said conduit means.

17. The oven of claim 12 wherein said cooking means includes an upper non-microwave radiant heating element disposed adjacent and below said directing means.

18. The oven of claim 12 wherein said cooking means includes a lower non-microwave radiant heating element disposed in said return means and distributed along the area below said food support such that at least a portion of the gas entering said return means is initially reheated by one said non-microwave radiant heating element prior to flow under the remainder of said food support.

19. The oven of claim 12 wherein said cooking means includes a convection heating element disposed in said return means.

20. The oven of claim 12 wherein said cooking means includes a gas combustion burner disposed below said food support.

* * * * *